Patented Aug. 29, 1950

2,520,161

UNITED STATES PATENT OFFICE 2,520,161

CARBOXYALKYL ETHERS OF CARBOHYDRATE GUMS

Owen A. Moe, Minneapolis, Minn., assignor to General Mills, Inc., a corporation of Delaware No Drawing. Application April 25, 1946, Serial No. 664,987

15 Claims. (Cl. 260—209)

The present invention relates to carboxyalkyl ethers of carbohydrate gums and to methods of producing the same. This application is a continuation in part of my copending application, Serial No. 612,717, filed August 25, 1945, entitled Carboxyalkyl Ethers of Carbohydrate Gums.

Carbohydrate gums such as gum arabic, gum tragacanth, gum karaya, locust bean gum, are frequently used in aqueous solution. In general, they are extremely difficult to dissolve, requiring long periods of soaking before they can be thoroughly dispersed. This is a particular disadvantage where an aqueous sol of such a gum is desired on short notice. In addition, such gums frequently do not disperse completely, and sols of commercially available gums are usually turbid and contain suspended solid particles. Moreover, such sol's are usually fairly viscous and accordingly incapable of filtration for removal of the suspended solids.

It has now been discovered that carboxyalkyl ethers, and especially alkali metal salts of the carboxyalkyl ethers of these gums are readily dispersible and form sols of excellent clarity, as compared to untreated gum. The invention is applicable to carbohydrate gums in general but is particularly applicable to the galactomannan and the glucomannan gums. These gums are polysaccharides composed principally of galactose and mannose units, and glucose and mannose units, respectively. The galactomannans are usually found in the endosperm of leguminous seeds, such as guar, locust bean, honey locust, flame tree, Cassia occidentalis, and the like. The glucomannans, on the other hand, are usually found in the corms of plants of the Araceae family, such as Amorphophallus oncophyllus, from which the product known as iles mannan is obtained, and Amorphophallus rivieri from which konnyaku flour is obtained. The carboxyalkyl ethers of the galactomannan gums and the glucomannan gums in general produce sols having viscosities comparable to that of sols of the untreated gums. In some instances the viscosity of the treated gum may be increased somewhat. It has been noted, moreover, that the carboxyalkyl ethers of the galactomannan and glucomannan gums form gels on addition of a dilute solution of metal salts such as ferrous sulfate, aluminum sulfate, aluminum chloride, and the like. These gels are very firm and can be transferred from one container to another without wetting the surface.

The other carbohydrate gums such as tragacanth, arabic, karaya, and the like, form carboxyalkyl ethers which produce aqueous sols of decidedly reduced viscosity as compared with the original gum. This is of particular advantage in those instances in which it is desired to have an aqueous sol of high concentration and at the same time have the sol at not too great a viscosity.

It is therefore a primary object of the present invention to provide novel carboxyalkyl ethers of carbohydrate gums. It is a further object of the present invention to provide alkali metal salts of carboxylakyl ethers of carbohydrate gums, said compounds being capable of ready dispersibility in aqueous media and formation of relatively clear sols. It is a further object of the present invention to provide carboxalkyl ethers of galactomannan and glucomannan type gums which are capable of forming gels from aqueous sols by means of solutions of metal salts such as ferrous sulfate, aluminum sulfate, aluminum chloride and the like. It is another object of the present invention to provide a process for making such products.

The carboxyalkyl ethers may be formed by treating the gum with a cold aqueous solution of an alkali such as sodium hydroxide and then treating the alkali gum with a halo fatty acid or halo fatty acid salt. In general, the treatment of the gum with the cold solution of alkali serves to disperse the gum without the occurrence of lumping. It is also possible to disperse the gum in aqueous alkali at a more elevated temperature by a more efficient stirring means. After dispersion of the gum in the aqueous alkali, the mixture is heated to an elevated temperature such as 60–90° C. and the reaction mixture will then frequently become semi-solid. This mass is then cooled and broken up into fine particles and treated with the etherifying agent, usually in the form of a halo fatty acid or salt thereof. This reaction mixture is then heated to a temperature of 80–85° C. for an appreciable period of time, 1 to 2 hours, with efficient mixing. The reaction mixture is then cooled and diluted with water and made acidic to phenolphthalein. The reaction product may then be precipitated by the addition of a water miscible organic solvent such as methanol, acetone, and the like, and may be washed with a similar mixture of water and organic solvent for further removal of impurities, and then dried and ground.

Any of the carbohydrate gums may be treated according to the present invention. Numerous examples of such gums have been mentioned herein and other examples will be apparent to those skilled in the art. Other alkalies such as potassium hydroxide, may be used in place of the sodium hydroxide. In the examples given hereinafter chloracetic acid and its salts are preferred as the etherifying agent in view of the ready availability of this material. Other etherifying agents such as chloropropionate, chlorobutyrate, or other halo fatty acids or salts thereof may be used in place of the chloracetate if desired. Instead of using the gum in a pure isolated form it is also possible to use impure forms of the gum, such as those obtained by merely grinding to a powder the entire seed or other form in which the gum occurs naturally. The carboxyalkyl ethers of the impure forms of gum display the same ready dispersibility and also display remarkable clarity considering the relatively impure nature of the starting material. They will not, in general, however, produce as clear sols as will the ethers of the purified gums.

Another method of making the carboxyethyl and substituted carboxyethyl derivatives of the galactomannan and glucomannan type gum is as follows: The gums are dispersed in an alkaline solution and then reacted with acrylonitrile or substituted acrylonitriles such as methacrylonitrile, all of which are contemplated by the term "an acrylonitrile" as used herein and in the claims. This reaction results in a cyanoethyl ether of the gum as disclosed in my co-pending application, Serial No. 664,986, now Patent No. 2,461,502, entitled Cyanoethyl Ethyl Ethers of Gums, filed of even date herewith. These cyanoethyl ethers may then by hydrolyzed in any suitable manner to produce the carboxyethyl gum ether or the alkali metal salts thereof. It is not necessary that the cyanoethyl ether be isolated from the reaction mixture before it is hydrolyzed to the carboxyethyl ether. This hydrolysis may be carried out directly on the crude reaction product. Apparently, the structural configuration of the galactomannan and glucomannan type gums permits rather vigorous hydrolytic conditions without suffering undue degradation.

Products made by this process can vary quite widely in the degree of substitution. Thus it is possible to prepare carboxyethyl gums having a degree of substitution varying from about .2 to about 1.7 carboxyethyl groups per anhydro sugar unit. When the carboxyalkyl ethers are prepared from the halo fatty acid they usually contain a lower degree of substitution such as around .5. It will be apparent, therefore, that this method makes possible ether derivatives of a higher degree of substitution than is possible with the other method.

The carboxyethyl gum ethers of the higher degree of substitution produce clear viscous 2% solutions which are capable of forming films possessing interesting properties. The films thus formed are of good clarity and strength. In some instances they tend to be somewhat brittle in an unplasticized condition but this may be overcome by the addition of a small amount of plasticizer such as glycerin or other polyhydroxy compounds.

The products of this invention find many and varied uses in the art. They may be used as thickening agents in general. They also serve as useful sizing and finishing agents. They may also serve as protective colloids and dispersions or emulsions are stabilized by their presence. The ability of these products to yield viscous 2% solutions displaying very good clarity and stability is of great interest in numerous pharmaceutical preparations.

The following examples will serve to illustrate the invention.

Example 1

Forty parts of locust bean gum were dispersed in 150 parts of 7% sodium hydroxide solution cooled to 0° C. The alkali-gum mixture was heated in a water bath to 80° C. and the reaction mixture became semi-solid. The resulting mass was firm and rubbery-like. After cooling, this mass was broken up into fine particles and the solution of the sodium chloracetate (23.5 parts of chloracetic acid in 50 parts of water was neutralized with 10 parts of sodium hydroxide in 20 parts of water) was added with efficient mixing. The resulting reaction mixture was heated in a water bath to 80–85° C. for a period of 90 minutes with efficient mixing. After cooling, the reaction mixture was diluted with 200 cc. of water and made acidic to phenolphthalein by addition of dilute acetic acid. The reaction product was precipitated by the addition of methanol. The precipitated product thus obtained was washed with methanol, dried and ground to a powder. The sodium carboxymethyl ether of locust bean gum thus prepared was readily dispersible in water to form 1% sols of remarkable clarity and stability and of a viscosity comparable to or higher than that of the gum itself. A 3% sol of very good clarity and high viscosity was very readily obtained. These sols formed gels which were firm when a solution of a metallic salt such as ferrous sulfate was added. The gels may be prepared in the following manner: Three to five parts of a 10% ferrous sulfate solution are added to 10 parts of a 3% carboxymethyl gum ether sol with efficient mixing. The gel formation takes place rapidly as the sol is stirred. It is, of course, apparent that the concentration of the ferrous sulfate and gum derivative sols may be varied over a wide range.

Example 2

Twenty parts of gum tragacanth were dispersed in 60 parts of 33% sodium hydroxide solution cooled to 0° C. This alkali-gum mixture was heated to 65° C. in the water bath with mixing and then cooled. The color of the mixture was dark red. Twenty-four parts of finely ground chloracetic acid was stirred in with cooling and after the addition of the etherifying agent was completed, the reaction mixture was heated in a water bath to 80° C. for a period of 90 minutes. The reaction mixture was very fluid and dark in color. The mixture was neutralized to phenolphthalein by the addition of dilute acetic acid. The reaction product was precipitated by the addition of methanol and worked up in the usual manner. Most of the color was removed during the alcoholic precipitation. This sodium carboxymethyl gum ether was very rapidly dispersible in water yielding sols which displayed very good clarity and stability. The sols were nonviscous and it was possible to make very concentrated sols (higher solids content) without encountering high viscosities. This product did not display any gel formation when a solution of ferrous sulfate was added.

Example 3

Forty parts of guar gum were dispersed in 220 parts of 10% sodium hydroxide solution cooled to 0° C. The resulting alkali-gum mixture was heated in a water bath to 80° C. with mixing. The mixture was cooled to room temperature and 24 parts of finely powdered chloracetic acid were stirred in with cooling. After the addition of chloracetic acid was completed, the reaction mixture was heated in a water bath with mixing for a period of 90 minutes at 80° C. The reaction mixture was then diluted with 500 cc. of water and neutralized with dilute acid. The reaction product was precipitated by the addition of methanol and the cooled product was worked up in the usual manner. This sodium carboxymethyl gum ether yielded viscous 2–4% sols in water and displayed good clarity and stability. This derivative dispersed in water at a surprisingly rapid rate and these aqueous sols displayed a gel formation upon the addition of a dilute ferrous sulfate solution. The gel formation takes place rapidly with stirring after the addition of the ferrous sulfate solution.

*Example 4*

Twenty parts of iles mannan flour were easily dispersed uniformly in 60 parts of 33% sodium hydroxide solution cooled to 0° C. This alkali-gum mixture was heated in a water bath and a solid, rubber-like mixture resulted. This solid, rigid, yet rubber-like mass was cooled and ground into fine particles. Then 22 parts of chloroacetic acid were mixed in well with cooling. After the addition of the etherifying agent was completed, the resulting reaction mixture was heated in a water bath to 80° C. and maintained at this temperature for a period of 90 minutes. The mixture was made acidic to phenolphthalein, cooled and diluted with 300 parts of water. The reaction mixture had a dark color which was removed by precipitating the reaction product with methanol. The precipitated product was treated in a usual manner. This sodium carboxymethyl gum ether was readily dispersible in cold water to yield viscous 2–4% sols of good clarity and stability. This product also showed the gel formation on the addition of a dilute ferrous sulfate solution. However, the tendency towards this gel formation was not as pronounced as in the case of the derivatives from locust bean gum and guar gum.

*Example 5*

Twenty parts of karaya gum were added to 60 parts of 43% sodium hydroxide solution at 5° C. The dispersion of the gum was very difficult and the resulting alkali-gum mixture was heated in a water bath and the originally very thick mixture became very fluid. After cooling to room temperature, 20 parts of chloracetic acid were added with efficient mixing. The resulting reaction mixture was heated to 80° C. for a period of 90 minutes. The cooled reaction mixture was very fluid and dark in color and it was made acidic to phenolphthalein with dilute acetic acid. The reaction product was isolated in the usual manner. This sodium carboxymethyl gum ether was very readily dispersible in water to give non-viscous sols of remarkable clarity and stability. It was possible to make solutions of high concentration with the greatest of ease. Again, it was noted that this type of product did not display the gel formation when a dilute solution of ferrous sulfate was added.

*Example 6*

Fifty-five parts of gum arabic were easily dissolved in a sodium hydroxide solution containing 13.3 parts of sodium hydroxide dissolved in 200 parts of water. To this resulting gum alkali mixture was added the solution of sodium chloracetic (31.5 parts chloracetic acid in 50 parts of water neutralized with 13.3 parts of sodium hydroxide and 20 parts of water). The resulting reaction mixture was heated to 80° C. for a period of 70 minutes. The cooled reaction mixture was neutralized and the reaction product isolated in a known manner. This sodium carboxymethyl gum ether was very readily dispersible in cold water to yield low viscosity sols of very good clarity and stability. Again, it was noted that this type of product did not yield the characteristic gel formation on the addition of a ferrous sulfate solution.

*Example 7*

Twenty parts of finely powdered locust bean gum were dispersed in 200 parts of water followed by the addition of 7 parts of sodium hydroxide solution. Thirty-five grams of acrylonitrile were added and the resulting reaction mixture was subjected to vigorous mixing until it was homogeneous. The resultant reaction mixture was allowed to stand at room temperature and after about 30 minutes the reaction product began to separate. The mixture was allowed to stand for four hours when the excess base was neutralized by the gradual addition of dilute acetic acid and an excess of methanol was added, and the reaction product was collected by filtration. The cyanoethylation product was washed with methanol and ether and dried in vacuo. This cyanoethyl ether of locust bean gum contained 9.1% nitrogen which corresponds to a degree of substitution of 1.6.

Two parts of the above cyanoethylation product were mixed with 20 parts of 10% aqueous sodium hydroxide solution and the resulting mixture was heated in a hot water bath. The mixture soon thickened and the evolution of copious quantities of ammonia was noted. Seventy-five parts of water were added gradually after heating was continued yielding a clear viscous solution. Complete solubility was attained. The reaction product was precipitated by the gradual addition of methanol, washed with fresh methanol and ether, collected by filtration and dried in vacuo. The dried product was dissolved in water to yield a very viscous and clear 2% solution. A portion of this solution was cast on a glass plate and the resulting film was clear, fairly flexible and strong. The hydrolyzed product (2-carboxyethyl gum ether) contained 0.16% nitrogen indicating that the hydrolysis was substantially complete.

*Example 8*

Two parts of a cyanoethyl ether of locust bean gum prepared in a similar manner to that of Example 7 but containing 9.2% nitrogen were mixed with 20 parts of a 15% sodium hydroxide solution, and the resulting reaction mixture was heated. The evolution of ammonia and the formation of a viscous mass were noted as the heating progressed. Seventy-five parts of water were added gradually with stirring and the heating was discontinued when complete solubility was effected. The reaction mixture was made neutral to phenolphthalein by the gradual addition of dilute acetic acid. The reaction product was precipitated by the addition of an excess of methanol. The product thus precipitated was worked up as previously described. This hydrolyzed product contained 0.29% nitrogen and formed excellent films.

Example 9

Ten parts of a cyanoethyl ether of a guar gum prepared in a similar manner to that of Example 7 but containing 8.66% nitrogen were mixed with 100 parts of 4% sodium hydroxide solution. The mixture was heated in a hot water bath and after approximately 3 minutes the mixture thickened and the evolution of ammonia was noted. After heating for 30 minutes, 100 parts of 6% sodium hydroxide solution were added and the heating was continued for an additional 30 minutes. An additional portion of water (100 parts) was added with efficient mixing and a clear viscous solution resulted. After neutralization with 5N acetic acid the 2-carboxyethyl ether was precipitated by the gradual addition of alcohol. The precipitated product was collected by filtration and dried in vacuo. The dried product dissolved in water to yield a viscous 2% solution. The films resulting from a solution of this type were clear and strong; however, the films were somewhat brittle when unplasticized.

Example 10

Ten parts of cyanoethyl ether of honey locust gum prepared in a similar manner to that of Example 7 were mixed with 100 parts of 10% sodium hydroxide solution and the resulting reaction mixture was heated in a hot water bath. After approximately three minutes this mixture thickened rapidly and the evolution of ammonia was noted. The addition of the water was accomplished in the manner described in Example 3. The reaction product was precipitated and collected in the manner previously described. A 2% solution of this 2-carboxyethyl ether of honey locust gum yielded films which possessed excellent clarity and strength. The somewhat brittle nature of the film was completely alleviated by the addition of a small amount of water soluble plasticizer such as glycerin.

Example 11

Two parts of the cyanoethyl ether of tara gum prepared in a similar manner to that of Example 7 were mixed with 20 parts of 20% sodium hydroxide solution. The resulting mixture was heated in a hot water bath in a manner similar to the examples previously described. The precipitation and collection of the product was accomplished in the known manner. This product yielded films displaying fair clarity, flexibility and strength.

In the same manner the 2-cyanoethyl ether of flame tree gum was hydrolyzed, and the hydrolyzed product was isolated with comparable results.

Example 12

Ten parts of honey locust gum were mixed with 100 parts of water and 10 parts of 20% sodium hydroxide solution were added. Ten parts of acrylonitrile were added with vigorous stirring and the resulting reaction mixture was allowed to stand at room temperature. When the first sign of separation of the cyanoethylation product was noted, the reaction mixture was placed in a water bath and a substantial amount of separation had occurred when the temperature reached 40° C. The upper liquid layer was then removed by decantation and 50 parts of 10% alkali were added. The resulting reacting mixture was heated in a water bath for one hour when an additional portion (50 parts) of water was added and the heating was continued for an additional 30 minutes when 50 parts of water were added with stirring. The total heating time was 90 minutes. The reaction mixture was diluted with 150 parts of water with virogous mixing. After neutralization the product was precipitated with methanol, collected and dried in vacuo. The 2-carboxyethyl ether of honey locust gum obtained in this manner yielded films which were clear, strong and flexible.

Example 13

Two parts of the cyanoethyl ether of iles mannan gum were mixed with twenty parts of a ten percent aqueous sodium hydroxide solution. The resulting reaction mixture was heated in a water bath, and the mixture soon thickened and a copious evolution of ammonia was noted. After heating for fifteen minutes at 80° C. thirty parts of water were added and the heating period was continued. The reaction mixture became extremely viscous and after thirty minutes the additional portion of water (thirty parts) was added. The resulting solution was extremely viscous. After cooling the reaction mixture was made just neutral to phenolphthalein by the gradual addition of 5 N acetic acid. The reaction product was precipitated by the gradual addition of methanol. The product thus precipitated was collected by filtration and worked up in the usual manner. The 2-carboxyethyl ether of iles mannan gum thus obtained was readily soluble in water and yielded a very viscous two per cent solution. A film resulting from this solution was fairly clear, possessed very good strength; however, it appeared to be rather brittle in an unplasticized state.

The products of this general type find manifold uses. The derivatives displaying good viscosity are excellent thickening agents for printing pastes. The products of this invention find numerous applications such as dressing and sizing agents, and uses in emulsions, cosmetics, lotions, and the like.

While various modifications of the invention have been described herein in detail it will be apparent that other variations are possible without departing from the spirit of the invention. It will be understood, therefore, that the details are illustrative only and that the invention is to be limited only by the appended claims.

I claim as my invention:

1. A carboxyalkyl ether of a carbohydrate gum selected from the group consisting of galactomannan and glucomannan gums.

2. A carboxymethyl ether of a carbohydrate gum selected from the group consisting of galactomannan and glucomannan gums.

3. A carboxyalkyl ether of a galactomannan gum.

4. A carboxymethyl ether of a galactomannan gum.

5. An alkali metal salt of a carboxyalkyl ether of a carbohydrate gum selected from the group consisting of galactomannan and glucomannan gums.

6. An alkali metal salt of a carboxymethyl ether of a carbohydrate gum selected from the group consisting of galactomannan and glucomannan gums.

7. A sodium carboxymethyl ether of a galactomannan gum.

8. A carboxyethyl ether of a carbohydrate gum selected from the group consisting of galactomannan and glucomannan gums.

9. A carboxyethyl ether of a galactomannan gum.

10. An alkali metal salt of a carboxyethyl ether of a carbohydrate gum selected from the group consisting of galactomannan and glucomannan gums.

11. A sodium carboxyethyl ether of a galactomannan gum.

12. The process of producing a carboxyethyl ether of a gum selected from the group consisting of galactomannan and glucomannan gums, which comprises dispersing the gum in a solution of an alkali, reacting the dispersed gum with an acrylonitrile to form the cyanoethyl ether of the gum and then hydrolyzing the cyanoethyl ether to a carboxyethyl ether of the gum.

13. A carboxyalkyl ether of a glucomannan gum.

14. A carboxymethyl ether of a glucomannan gum.

15. A sodium carboxymethyl ether of a glucomannan gum.

OWEN A. MOE.

REFERENCES CITED

The following references are of record in the file of this patent:

UNITED STATES PATENTS

| Number | Name | Date |
| --- | --- | --- |
| 1,350,820 | Lilienfeld | Aug. 24, 1920 |
| 2,190,179 | Ziese et al. | Feb. 13, 1940 |
| 2,316,128 | Back et al. | Apr. 6, 1943 |
| 2,344,179 | Stahly | Mar. 14, 1944 |
| 2,388,887 | Weissberger | Nov. 13, 1945 |